(12) United States Patent
Hashimoto

(10) Patent No.: US 8,823,302 B2
(45) Date of Patent: Sep. 2, 2014

(54) CONTROL APPARATUS FOR SWITCHING CIRCUIT

(75) Inventor: Junichi Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 13/481,865

(22) Filed: May 28, 2012

(65) Prior Publication Data

US 2013/0009585 A1    Jan. 10, 2013

(30) Foreign Application Priority Data

Jul. 4, 2011    (JP) ................................. 2011-147930

(51) Int. Cl.
*H02P 1/04*    (2006.01)
*H02P 27/04*    (2006.01)
*H02P 27/08*    (2006.01)
*H02M 1/38*    (2007.01)
*H02M 7/5395*    (2006.01)

(52) U.S. Cl.
CPC ....... *H02P 27/045* (2013.01); *H02M 2001/385* (2013.01); *H02M 7/5395* (2013.01); *H02P 27/08* (2013.01)
USPC ...... 318/400.17; 318/503; 318/434; 318/800; 318/400.07; 318/802; 701/22; 701/42

(58) Field of Classification Search
USPC ......... 318/621, 432, 632, 808, 801, 812, 380, 318/721, 800, 438, 400.07, 400.09; 180/65.23, 65.245, 65.27, 65.28, 180/65.285, 65.29; 701/42, 31.4, 22, 41
See application file for complete search history.

(56) References Cited

U.S. PATENT DOCUMENTS

| | | | | |
|---|---|---|---|---|
| 5,686,807 | A * | 11/1997 | Kusano et al. | 318/808 |
| 6,121,736 | A * | 9/2000 | Narazaki et al. | 318/400.35 |
| 7,112,936 | B2 * | 9/2006 | Lee | 318/400.01 |
| 2006/0006832 | A1 * | 1/2006 | Kitajima et al. | 318/800 |
| 2006/0113938 | A1 * | 6/2006 | Arai | 318/432 |
| 2009/0058337 | A1 * | 3/2009 | Kato et al. | 318/400.09 |
| 2009/0073617 | A1 * | 3/2009 | Gunji | 361/23 |
| 2009/0240389 | A1 * | 9/2009 | Nomura et al. | 701/29 |

FOREIGN PATENT DOCUMENTS

| | | | |
|---|---|---|---|
| JP | 2010-259241 | | 11/2010 |
| JP | 2010259241 | A * | 11/2010 |
| WO | WO 2009/081561 | | 7/2009 |
| WO | WO 2009081561 | A1 * | 7/2009 |
| WO | WO 2011/136003 | A1 | 11/2011 |

OTHER PUBLICATIONS

Japanese Office Action for corresponding JP Application No. 2011-147930, Sep. 24, 2013.

* cited by examiner

*Primary Examiner* — Eduardo Colon Santana
*Assistant Examiner* — Jorge L Carrasquillo
(74) *Attorney, Agent, or Firm* — Mori & Ward, LLP

(57) ABSTRACT

A control apparatus for a switching circuit includes a controller, a target-rotational-speed acquiring device, a target-torque acquiring device, and an ON-time varying device. The controller is configured to turn on a bidirectional conduction switching device provided parallel to a reverse conducting device through which a commutation current flows. The target-rotational-speed acquiring device is configured to acquire a target rotational speed of an alternating current motor. The target-torque acquiring device is configured to acquire a target torque of the alternating current motor. The ON-time varying device is configured to vary, on a basis of the target rotational speed and the target torque, an ON time period during which the bidirectional conduction switching device provided parallel to the reverse conducting device through which a commutation current flows is turned on.

5 Claims, 9 Drawing Sheets

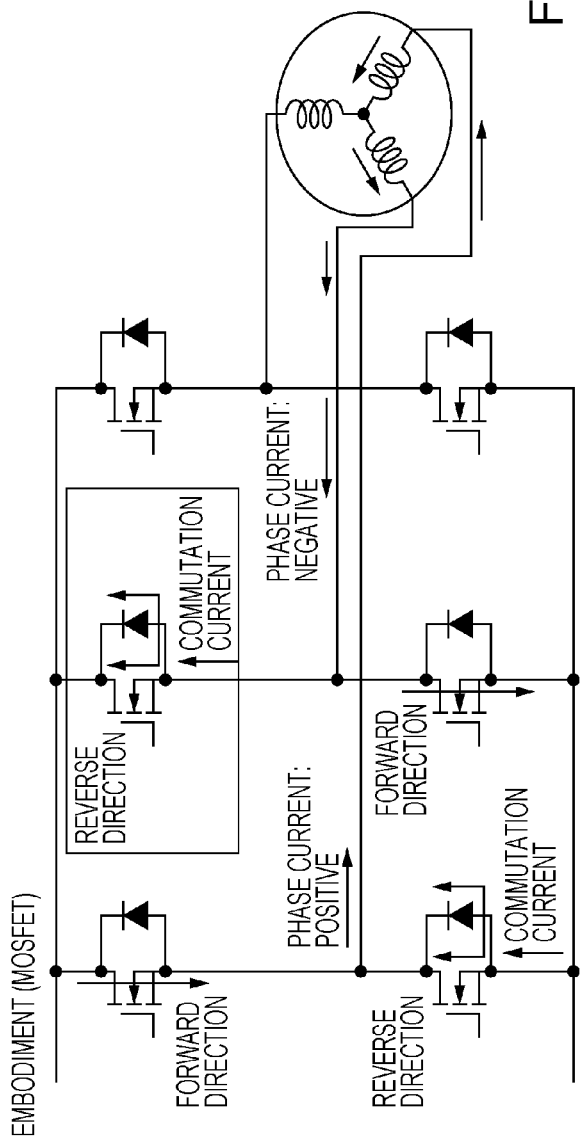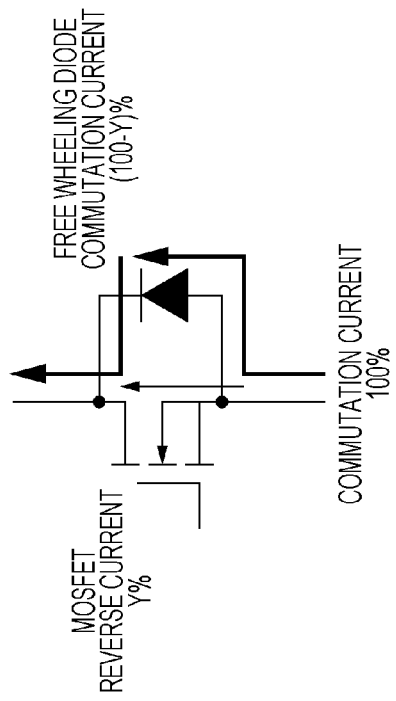

CONTROL APPARATUS FOR SWITCHING CIRCUIT

CROSS-REFERENCE TO RELATED APPLICATIONS

The present application claims priority under 35 U.S.C. §119 to Japanese Patent Application No. 2011-147930, filed Jul. 4, 2011, entitled "Control Apparatus for Switching Circuit." The contents of this application are incorporated herein by reference in their entirety.

BACKGROUND OF THE INVENTION

1. Field of the Invention

The embodiments discussed herein are related to a control apparatus for a switching circuit.

2. Discussion of the Background

Apparatuses have been hitherto known, which are mounted in, for example, electric vehicles and which performs on-off control to switching devices (for example, bidirectional semiconductor devices, such as metal oxide semiconductor field effect transistors (MOSFETs), capable of reverse conducting) in switching circuits by using power supplied from direct current (DC) power sources to drive loads such as motors.

The switching circuits provided in the apparatuses each include high-side switching devices composing high-side arms connected to a higher-voltage-side terminal, low-side switching devices composing low-side arms connected to a lower-voltage-side terminal, and free wheeling diodes connected in parallel to the switching devices in a reverse conducting direction. Inductive loads, such as motors, are connected to the connection points between the high-side arms and the low-side arms.

SUMMARY OF THE INVENTION

According to one aspect of the present invention, a control apparatus is for a switching circuit that includes a plurality of bidirectional conduction switching devices connected in series to each other and a plurality of reverse conducting devices respectively connected in parallel to the bidirectional conduction switching devices with respect to forward conduction of the bidirectional conduction switching devices, and that is configured to perform power conversion between a direct current power source and an alternating current motor. The control apparatus includes a controller, a target-rotational-speed acquiring device, a target-torque acquiring device, and an ON-time varying device. The controller is configured to turn on the bidirectional conduction switching device provided parallel to the reverse conducting device through which a commutation current flows. The target-rotational-speed acquiring device is configured to acquire a target rotational speed of the alternating current motor. The target-torque acquiring device is configured to acquire a target torque of the alternating current motor. The ON-time varying device is configured to vary, on a basis of the target rotational speed and the target torque, an ON time period during which the bidirectional conduction switching device provided parallel to the reverse conducting device through which the commutation current flows is turned on.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 7A to 7C are diagrams illustrating examples of a current conducting state in a comparative example and an exemplary embodiment of the control apparatus for the switching circuit according to the embodiment;

DESCRIPTION OF THE EMBODIMENTS

Figure 1:
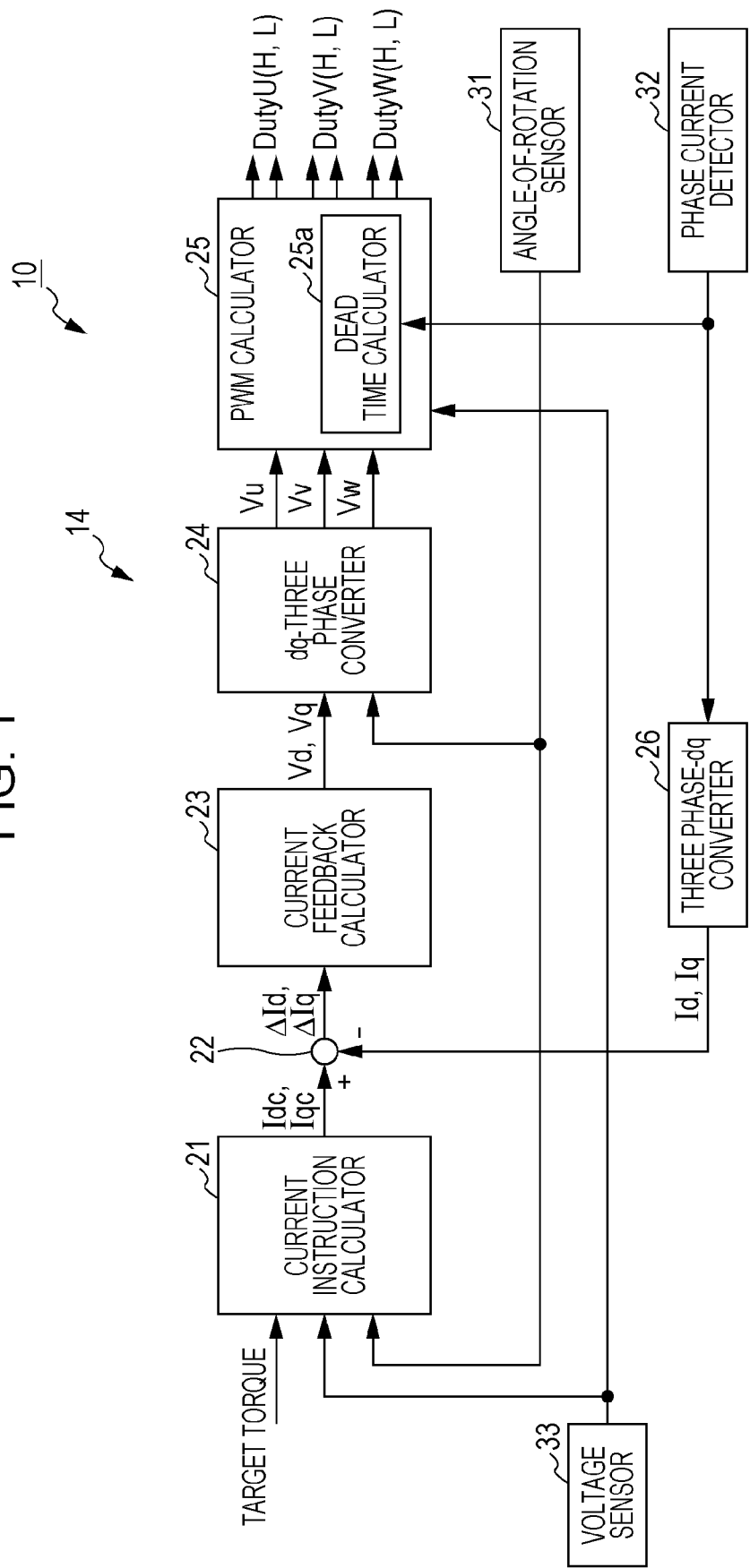
FIG. 1 is a diagram illustrating an example of the configuration of a control apparatus for a switching circuit according to an embodiment.

The embodiments will now be described with reference to the accompanying drawings, wherein like reference numerals designate corresponding or identical elements throughout the various drawings.

Figure 2:
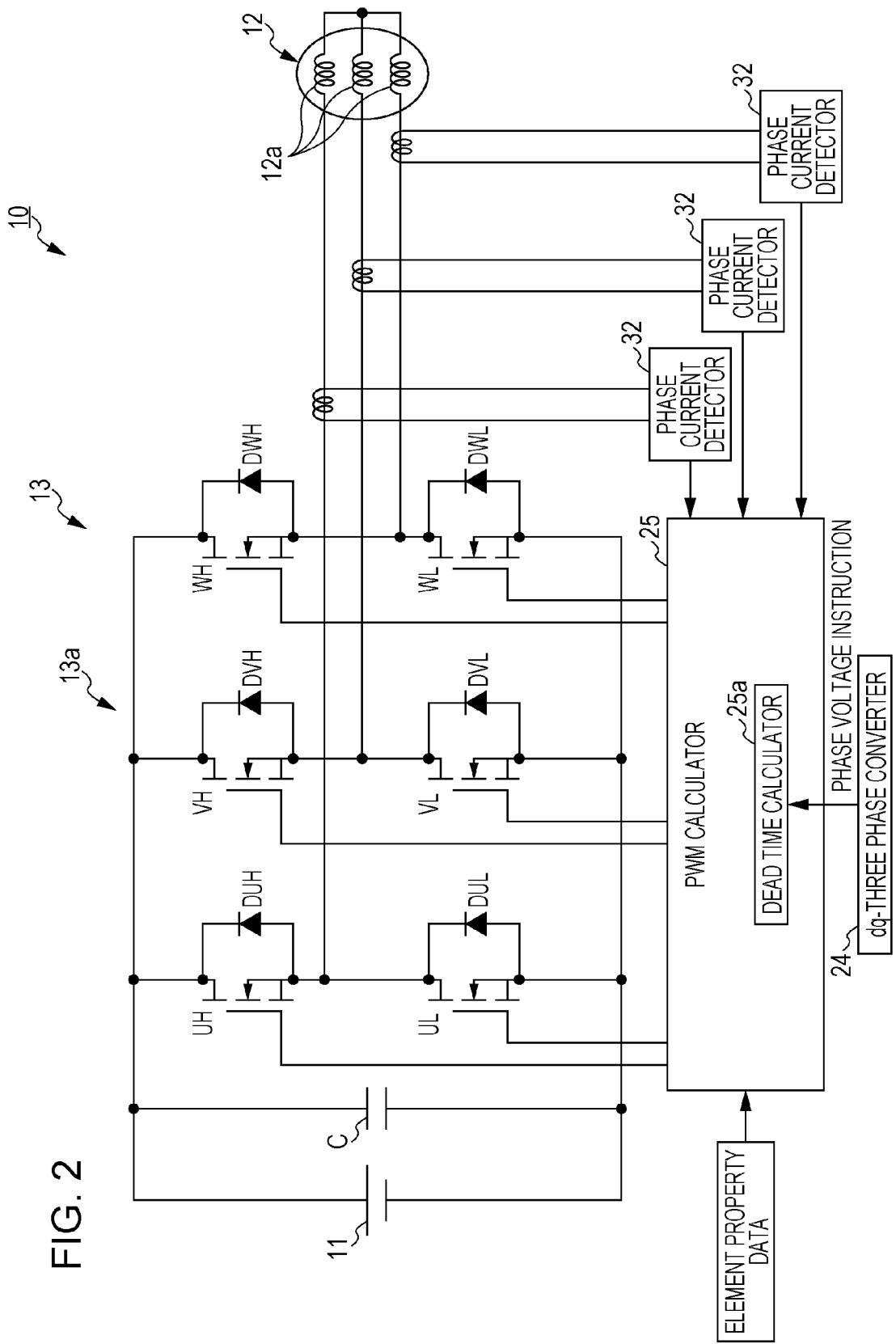
FIG. 2 is another diagram illustrating the example of the configuration of the control apparatus for the switching circuit according to the embodiment.

FIG. 1 and FIG. 2 illustrate an example of the configuration of a control apparatus 10 for a switching circuit according to the embodiment. The control apparatus 10 is mounted in, for example, a vehicle and includes an inverter 13 and a processing unit 14. The inverter 13 controls a three-phase (for example, a U phase, a V phase, and a W phase) brushless DC motor 12 (hereinafter simply referred to as a motor 12) by using a battery 11 as a DC power source.

The inverter 13 includes a bridge circuit 13a and a smoothing capacitor C. The bridge circuit 13a is composed of multiple switching devices (for example, bidirectional MOSFETs) that are bridge-connected to each other. The bridge circuit 13a is driven in response to a signal subjected to pulse width modulation (PWM).

In the bridge circuit 13a, a high-side U-phase transistor UH and a low-side U-phase transistor UL for the U phase, a high-side V-phase transistor VH and a low-side V-phase transistor VL for the V phase, and a high-side W-phase transistor WH and a low-side W-phase transistor WL for the W phase are bridge-connected to each other.

The drains of the transistors UH, VH, and WH are connected to a positive electrode side terminal of the battery 11 to compose high-side arms. The sources of the transistors UL, VL, and WL are connected to a negative electrode side terminal of the battery 11, which is grounded, to compose low-side arms.

The sources of the transistors UH, VH, and WH in the high-side arms are connected to the drains of the transistors UL, VL, and WL in the low-side arms, respectively. A free wheeling diode DUH is connected between the drain and source of the transistor UH, a free wheeling diode DUL is connected between the drain and source of the transistor UL, a free wheeling diode DVH is connected between the drain and source of the transistor VH, a free wheeling diode DVL is connected between the drain and source of the transistor VL, a free wheeling diode DWH is connected between the drain and source of the transistor WH, and a free wheeling diode DWL is connected between the drain and source of the transistor WL such that the direction from the sources to the drains is made a forward direction.

Specifically, the high-side arm is connected in series to the low-side arm for every phase in the bridge circuit 13a. In the high-side arms, the high-side switching devices (the transistors UH, VH, and WH) are connected in anti-parallel to the free wheeling diodes (the free wheeling diodes DUH, DVH, and DWH), respectively, (that is, the bidirectional conduction high-side switching devices are connected in parallel to the reverse conducting free wheeling diodes with respect to forward conduction of the high-side switching devices). In the low-side arms, the low-side switching devices (the transistors UL, VL, and WL) are connected in anti-parallel to the free wheeling diodes (the free wheeling diodes DUL, DVL, and DWL), respectively, (that is, the bidirectional conduction low-side switching devices are connected in parallel to the reverse conducting free wheeling diodes with respect to the forward conduction of the low-side switching devices).

Stator windings 12a of the motor 12 are connected to the connection points between the high-side arms and the low-side arms for the respective phases.

For example, when the motor 12 is driven, the inverter 13 switches an on (conduction)-off (disconnection) state of the transistors that are paired for every phase on the basis of gate signals (that is, PWM signals), which are switching instructions supplied from the processing unit 14 to the gates of the transistors UH, VH, WH, UL, VL, and WL. The switching of the on (conduction)-off (disconnection) state of the transistors causes the DC power supplied from the battery 11 to be converted into three-phase alternating current (AC) power to sequentially commutate the current to the three-phase stator windings 12a, thereby applying AC U-phase current Iu, AC V-phase current Iv, and AC W-phase current Iw to the stator windings 12a for the respective phases.

In contrast, for example, when the motor 12 is being subjected to regeneration, the inverter 13 switches the on (conduction)-off (disconnection) state of the transistors that are paired for every phase on the basis of gate signals (that is, PWM signals) that are synchronized based on the angle of rotation of the motor 12 and that are supplied from the processing unit 14 to convert the three-phase AC power supplied from the motor 12 into the DC power and to charge the battery 11 with the DC power.

The processing unit 14 performs feedback control (vector control) to the current on, for example, dq coordinates representing a rotating Cartesian coordinate system. The processing unit 14 calculates a target d-axis current Idc and a target q-axis current Iqc, calculates voltage instructions Vu, Vv, and Vw for the respective phases on the basis of the target d-axis current Idc and the target q-axis current Iqc, and outputs the PWM signals, which are the gate signals for the inverter 13, in accordance with the voltage instructions Vu, Vv, and Vw for the respective phases. The processing unit 14 controls a d-axis current Id and a q-axis current Iq resulting from conversion of the currents Iu, Iv, and Iw for the respective phases practically supplied from the inverter 13 to the motor 12 on the dq coordinates so that the difference between the d-axis current Id and the target d-axis current Idc and the difference between the q-axis current Iq and the target q-axis current Iqc are equal to zero.

The processing unit 14 includes, for example, a current instruction calculator 21, a difference calculator 22, a current feedback calculator 23, a dq-three phase converter 24, a PWM calculator 25, and a three phase-dq converter 26.

The current instruction calculator 21 calculates current instructions for specifying the currents Iu, Iv, and Iw for the respective phases supplied from the inverter 13 to the motor 12 on the basis of a target torque and a target number of revolutions (a target rotational speed) of the motor 12. The current instructions are supplied to the difference calculator 22 as the target d-axis current Idc and the target q-axis current Iqc on the rotating Cartesian coordinate system.

The number of revolutions of the motor 12 may be calculated on the basis of a detected value supplied from an angle-of-rotation sensor 31 that detects the angle of rotation of a rotor (not shown) (for example, the rotation angle of the magnetic pole of the rotor from a certain reference rotation position) or may be detected by a number-of-revolutions sensor (not shown) that detects the number of revolutions of the rotor (not shown).

Figure 3:
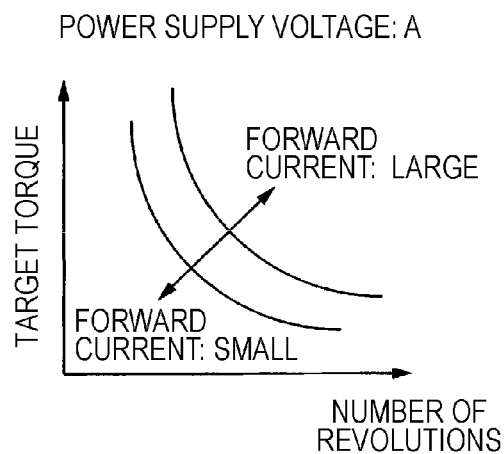
FIG. 3 illustrates an example of correspondence between a target torque and a target number of revolutions of a motor and forward current in the control apparatus for the switching circuit according to the embodiment.

The current instruction calculator 21 stores in advance data such as a map which indicates certain correspondence, as illustrated in FIG. 3, between the target torque and the target number of revolutions of the motor 12 and the forward current of the switching devices in association with multiple different power supply voltages (that is, the voltages output from the battery 11).

The current instruction calculator 21 acquires the forward current of the switching devices associated with the target torque and the target number of revolutions of the motor 12 and the power supply voltage detected by a voltage sensor 33, for example, by searching the map stored in advance to calculate the target d-axis current Idc and the target q-axis current Iqc corresponding to the forward current.

Although the forward current is set so as to be increased with the increasing target torque, with the increasing target number of revolutions, or with the decreasing power supply voltage in the certain map for an appropriate power supply voltage A illustrated in FIG. 3, the forward current is not limited to the one illustrated in FIG. 3. For example, the forward current may be set so as to exhibit an appropriate trend in accordance with the properties of the motor 12 and the inverter 13 or element property data.

On the dq coordinates representing the rotating Cartesian coordinate system, for example, the direction of a magnetic flux of the field pole caused by a permanent magnet provided in the rotor (not shown) in the motor 12 is represented as the d axis (field magnetic axis) and the direction orthogonal to the d axis is represented as the q axis (torque axis). The dq coordinates rotate in synchronization with the rotation phase of the rotor.

The target d-axis current Idc and the target q-axis current Iqc, which are DC signals, are supplied as the current instructions for AC signals supplied from the inverter 13 to the respective phases of the motor 12.

The difference calculator 22 calculates a difference ΔId between the target d-axis current Idc supplied from the current instruction calculator 21 and the d-axis current Id supplied from the three phase-dq converter 26 and a difference ΔIq between the target q-axis current Iqc supplied from the current instruction calculator 21 and the q-axis current Iq supplied from the three phase-dq converter 26.

The current feedback calculator 23 amplifies the differences ΔId and ΔIq by, for example, a proportional plus integral plus derivative (PID) action to calculate a d-axis voltage instruction value Vd and a q-axis voltage instruction value Vq.

The dq-three phase converter 24 converts the d-axis voltage instruction value Vd and the q-axis voltage instruction value Vq on the dq coordinates into a U-phase output voltage Vu, a V-phase output voltage Vv, and a W-phase output voltage Vw, which are voltage instruction values on three-phase AC coordinates representing a coordinate system at rest, with the detected value of the angle of rotation supplied from the angle-of-rotation sensor 31 that detects the angle of rotation of the rotor (not shown) in the motor 12.

For example, when the motor 12 is driven, in order to apply the AC sine-wave U-phase current Iu, V-phase current Iv, and W-phase current Iw to the stator windings 12a for the respective phases, the PWM calculator 25 compares the output voltages Vu, Vv, and Vw for the respective phase with a carrier signal composed of, for example, triangular waves to generate the gate signals (that is, the PWM signals) for the on-off driving of the transistors UH, VH, WH, UL, VL, and WL in the inverter 13.

Figure 4:
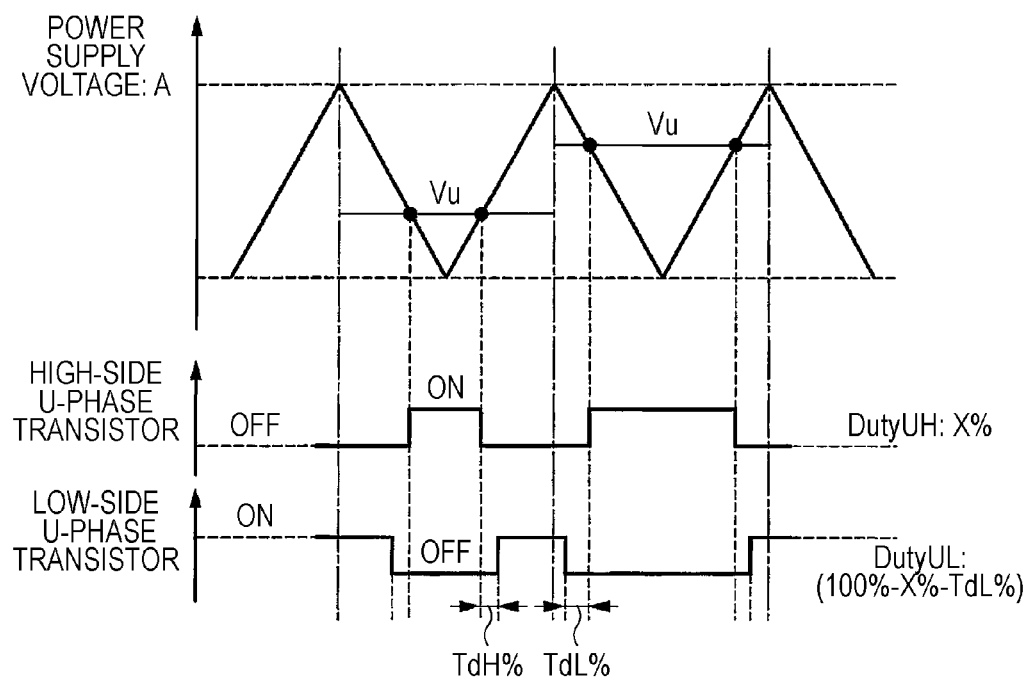
FIG. 4 illustrates an example of an on-off state of a high-side switching device and a low-side switching device in the control apparatus for the switching circuit according to the embodiment.

The PWM calculator 25 alternately turns on and off the switching devices in the high-side arms and the switching devices in the low-side arms in the bridge circuit 13a by so-called complementary PWM, for example, in a manner illustrated in FIG. 4. The ON ratio of the high-side switching devices and the low-side switching devices for the respective phases is set as high-side and low-side on duty DutyU (H,L), high-side and low-side on duty DutyV (H,L), and high-side and low-side on duty DutyW (H,L) for the respective phases.

A state in which a high-side switching device (SW1) in the high-side arm is set to ON and a low-side switching device (SW2) in the low-side arm is set to OFF and a state in which the high-side switching device (SW1) in the high-side arm is set to OFF and the low-side switching device (SW2) in the low-side arm is set to ON are alternately switched.

Figure 5:
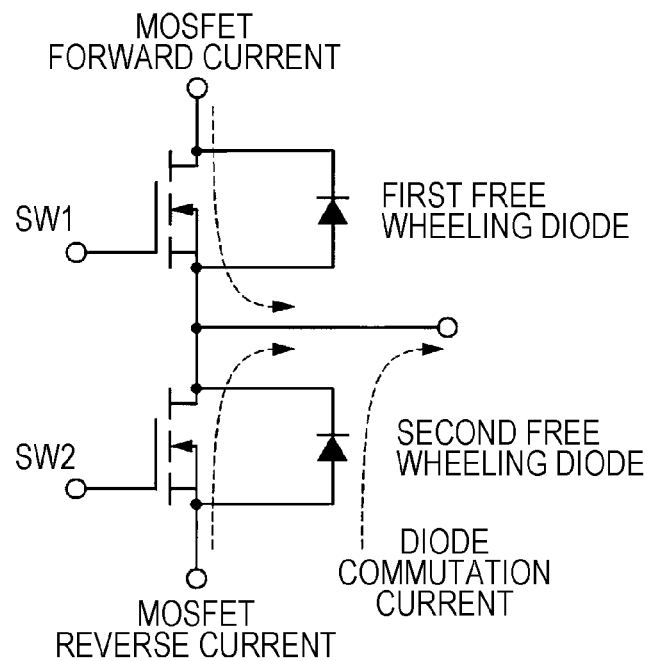
FIG. 5 illustrates an example of currents flowing through a high-side switching device, a low-side switching device, and a free wheeling diode in the control apparatus for the switching circuit according to the embodiment.

When the forward current flows through the high-side switching device (SW1) in the state in which the high-side switching device (SW1) in the high-side arm is set to ON, as illustrated in FIG. 5, a reverse current flows through the low-side switching device (SW2) in the state in which the low-side switching device (SW2) in the low-side arm is set to ON and a commutation current flows through a free wheeling diode (2) connected in anti-parallel to the low-side switching device (SW2).

In contrast, when the forward current flows through the low-side switching device (SW2) in the state in which the low-side switching device (SW2) in the low-side arm is set to ON, the reverse current flows through the high-side switching device (SW1) in the state in which the high-side switching device (SW1) in the high-side arm is set to ON and the commutation current flows through a free wheeling diode (1) connected in anti-parallel to the high-side switching device (SW1).

When the commutation current (the reverse current) flows through both the switching device and the free wheeling diode connected in parallel to each other in the state in which the switching device parallel to the free wheeling diode through which the commutation current flows is set to ON, as illustrated in FIG. 5, the combined resistance of the switching device and the free wheeling diode connected in parallel to each other is smaller than that in a case in which the commutation current (the reverse current) flows through only the switching device or the free wheeling diode, so that it is possible to reduce the loss in the entire switching circuit.

The PWM calculator 25 includes a dead time calculator 25a. The dead time calculator 25a is capable of setting a dead time concerning an ON time when either of the high-side switching device and the low-side switching device is turned on depending on the direction of each phase current applied to the motor 12 in accordance with the target number of revolutions and the target torque of the motor 12 and the power supply voltage detected by the voltage sensor 33 (that is, the voltage output from the battery 11).

For example, the dead time calculator 25a sets the dead time of the switching device through which the forward current flows, among the high-side switching devices (the transistors UH, VH, and WH) and the low-side switching devices (the transistors UL, VL, and WL), to a certain minimum dead time Td_Min (for example, 5%).

The dead time calculator 25a sets the dead time of the switching device parallel to the free wheeling diode through which the commutation current flows, among the high-side switching devices (the transistors UH, VH, and WH) and the low-side switching devices (the transistors UL, VL, and WL), in accordance with the target number of revolutions and the target torque of the motor 12 and the power supply voltage.

Figure 6:
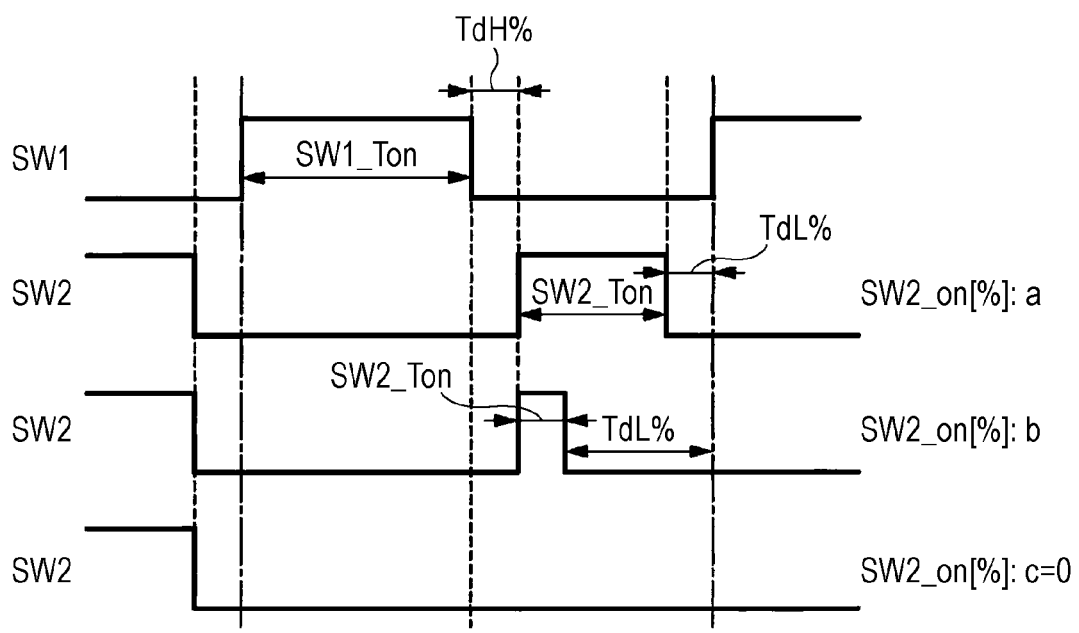
FIG. 6 illustrates an example of the on-off state of a high-side switching device and a low-side switching device in the control apparatus for the switching circuit according to the embodiment.

Accordingly, for example, as illustrated in FIG. 6, an on duty (SW2_Ton) of the switching device (the switching device parallel to the free wheeling diode through which the commutation current flows), set by the dead time calculator 25a, is set to an appropriate value (for example, a %, b %, or c %) between zero and a certain upper limit (=100%−SW1_Ton %−Td_Min %) corresponding to the certain minimum dead time Td_Min.

Figure 7A:
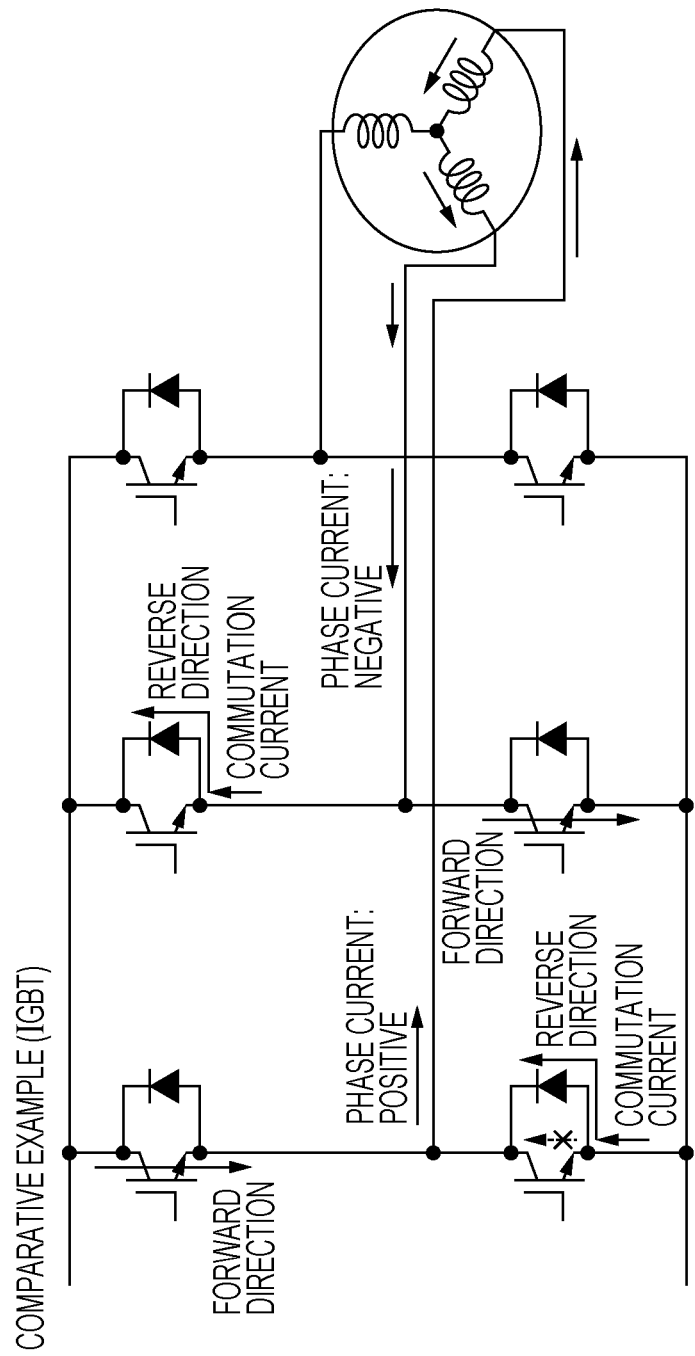

As a result, for example, in a comparative example adopting insulated gate bipolar transistors (IGBTs) as the switching devices as illustrated in FIG. 7A, the reverse current does not flow through the switching devices even if the switching devices are turned on and the commutation current flows through only the free wheeling diodes. In contrast, for example, in an exemplary embodiment adopting the MOSFETs as the switching devices illustrated in FIG. 7B and FIG. 7C, the commutation current (the reverse current) flows through both the switching devices and the free wheeling diodes in accordance with the dead time set by the dead time calculator 25a.

The dead time calculator 25a stores, for example, a map or a formula concerning the dead time of the switching devices parallel to the free wheeling diodes through which the commutation current flows, among the high-side switching devices and the low-side switching devices, and sets the dead time of the switching devices parallel to the free wheeling diodes through which the commutation current flows on the basis of the map or the formula.

Figure 8:
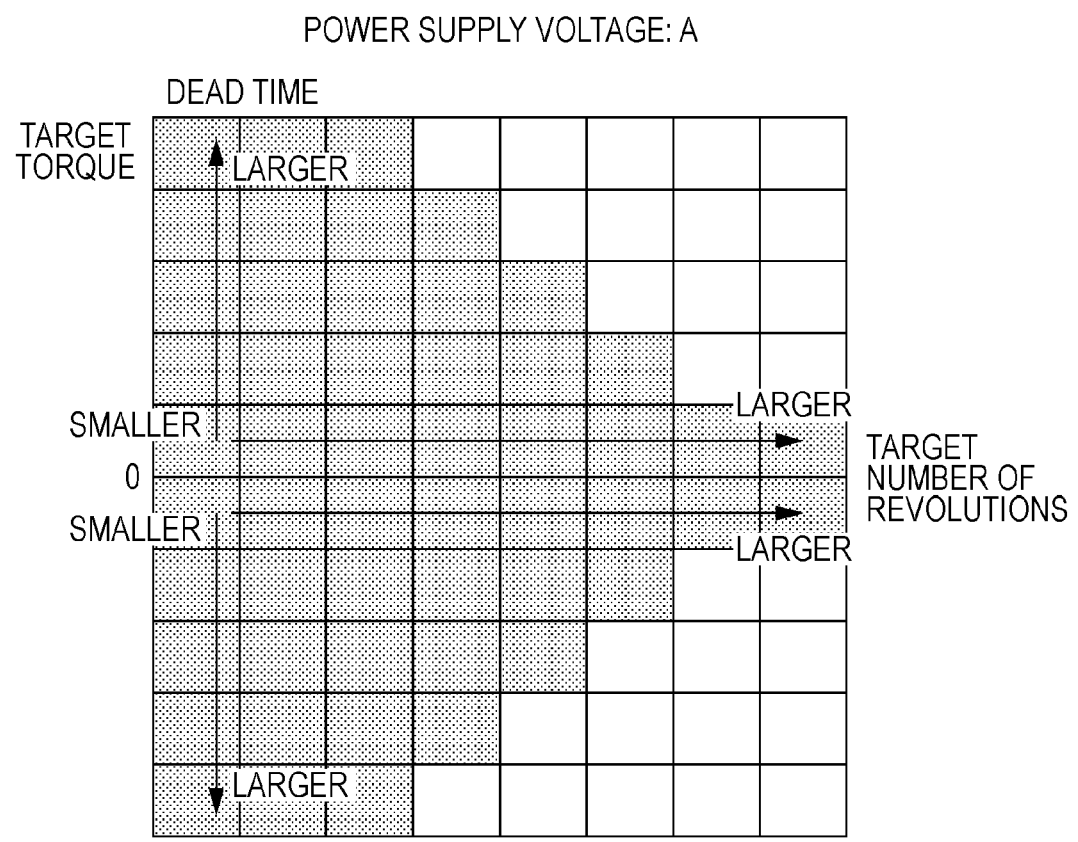
FIG. 8 illustrates an example of correspondence between the target torque and the target number of revolutions of the motor and a dead time of the switching device in the control apparatus for the switching circuit according to the embodiment.

For example, in a certain map for the appropriate power supply voltage A illustrated in FIG. 8, it is determined that the loss in the switching devices is increased with the increasing target number of revolutions of the motor 12 or the increasing target torque of the motor 12, in which powering is set to positive and the regeneration is set to negative, the dead time is set so as to be increased, and the reverse current flowing through the switching devices is set so as to be decreased (that is, the commutation current flowing through the free wheeling diodes connected in anti-parallel to the switching devices is set so as to be increased).

It is determined that the loss in the switching devices is decreased with the increasing power supply voltage, the dead time is set so as to be decreased, and the reverse current flowing through the switching devices is set so as to be increased (that is, the commutation current flowing through the free wheeling diodes connected in anti-parallel to the switching devices is set so as to be decreased).

The trend of the dead time is not limited to the above. For example, the dead time may be set so as to exhibit an appropriate trend corresponding to the properties of the motor 12 and the inverter 13, the element property data, or the like.

The three phase-dq converter 26 calculates the d-axis current Id and the q-axis current Iq on the rotating coordinate system based on the rotation phase of the motor 12, that is, on the dq coordinates with the values of the currents Iu, Iv, and Iw for the respective phases detected by phase current detectors 32 for the respective phases and the detected value of the angle of rotation supplied from the angle-of-rotation sensor 31.

An exemplary operation of the control apparatus 10 for the switching circuit according to the present embodiment, which has the above configuration, will now be described. In particular, a process of setting the dead time (dead time period) concerning the ON time (ON time period) when either of the high-side switching device and the low-side switching device is turned on will now be described.

Figure 9:
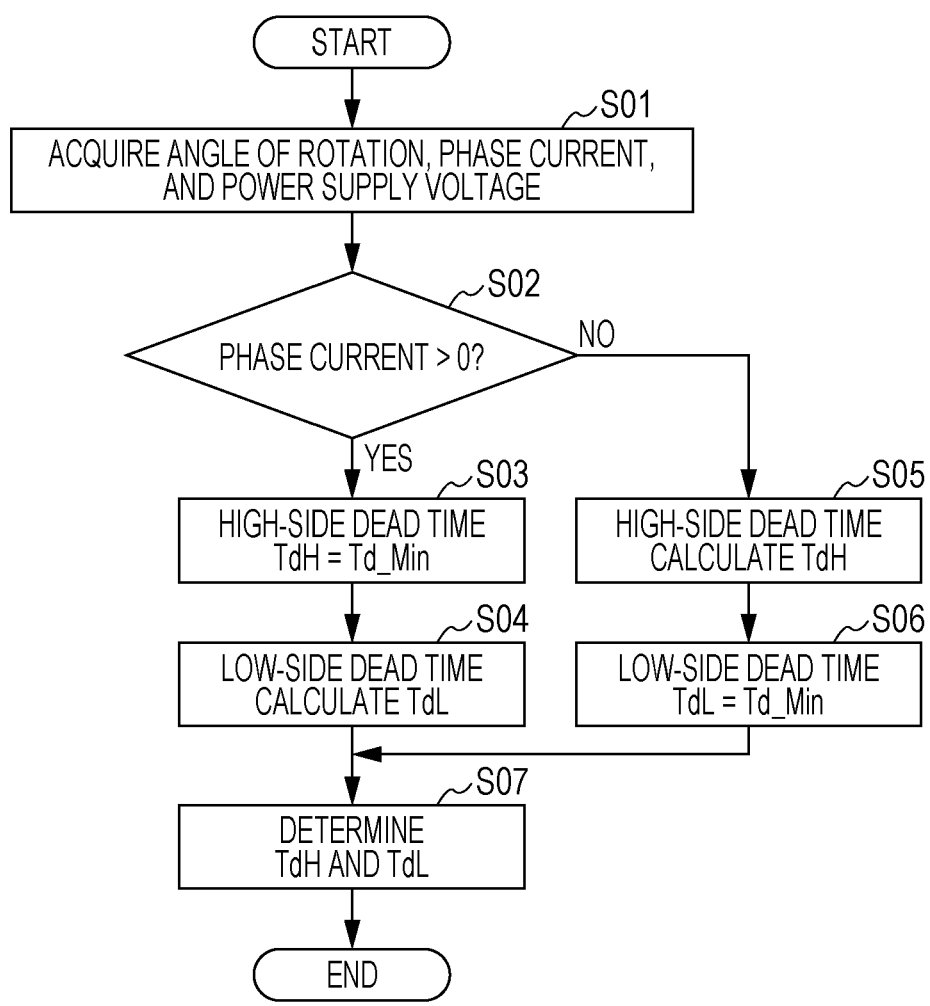
FIG. 9 is a flow chart illustrating an exemplary operational process of the control apparatus for the switching circuit according to the embodiment.

FIG. 9 illustrates an example of the process of setting the dead time concerning the ON time when either of the high-side switching device and the low-side switching device is turned on. Referring to FIG. 9, in Step S01, the control apparatus 10 acquires the angle of rotation and the phase current of the motor 12 and the power supply voltage (that is, the voltage output from the battery 11).

In Step S02, the control apparatus 10 determines whether the phase current is larger than zero, that is, whether the sign of the phase current is positive.

If the sign of the phase current is positive, the process goes to Step S03.

If the sign of the phase current is not positive, the process goes to Step S05.

In Step S03, the control apparatus 10 sets a dead time TdH of the high-side switching device in the high-side arm, through which the forward current flows when the switching device is turned on, to the certain minimum dead time Td_Min (for example, 5%).

In Step S04, the control apparatus 10 calculates a dead time TdL of the low-side switching device in the low-side arm, through which the forward current does not flow when the switching device is turned on (that is, through which the reverse current flows), for example, by searching a certain map based on the target number of revolutions and the target torque of the motor 12 and the power supply voltage. Then, the process goes to Step S07.

In Step S05, the control apparatus 10 calculates the dead time TdH of the high-side switching device in the high-side arm, which is the switching device parallel to the free wheeling diode through which the commutation current flows (that is, the switching device through which the reverse current flows when the switching device is turned on), for example, by searching the certain map based on the target number of revolutions and the target torque of the motor 12 and the power supply voltage.

In Step S06, the control apparatus 10 sets the dead time TdL of the low-side switching device in the low-side arm, through which the forward current flows when the switching device is turned on, to the certain minimum dead time Td_Min (for example, 5%). Then, the process goes to Step S07.

In Step S07, the control apparatus 10 determines the dead time TdH and the dead time TdL that have been set. Then, the process in FIG. 9 is terminated.

Figure 10:
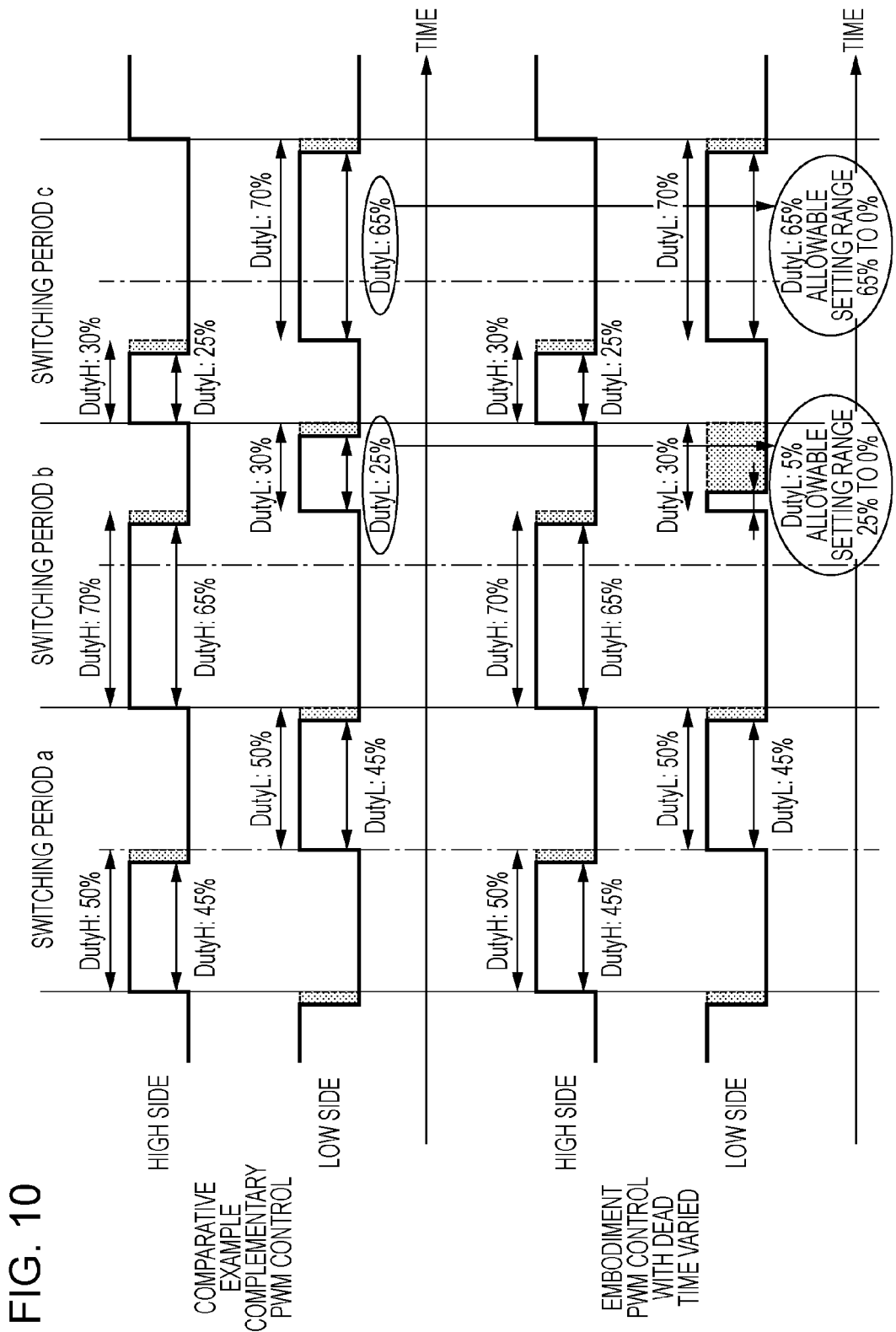
FIG. 10 illustrates examples of the current conducting state in a comparative example and an exemplary embodiment of the control apparatus for the switching circuit according to the embodiment.

For example, in a comparative example illustrated in FIG. 10, the complementary PWM control is performed to alternately turn on and off the switching devices with the dead time of each switching device in the high-side arms and the low-side arms in the bridge circuit 13a being made constant (for example, being set to the certain minimum dead time Td_Min: 5%). In contrast, in an exemplary embodiment illustrated in FIG. 10, PWM control with the dead time varied, in which the dead time is set by the dead time calculator 25a, is performed.

In the examples in FIG. 10, during a switching period a, the phase current is smaller than a certain value, the current sign of the phase current is positive or negative, and the reverse current flowing through the switching device is larger than the commutation current flowing through the free wheeling diode connected in anti-parallel to the switching device. The dead time TdH and the dead time TdL in the comparative example are equal to those in the embodiment during the switching period a.

During a switching period b, the phase current is larger than the certain value, the current sign of the phase current is positive, and the reverse current flowing through the switching device is smaller than the commutation current flowing through the free wheeling diode connected in anti-parallel to the switching device. The dead time TdH and the dead time TdL are constant (for example, are set to the certain minimum dead time Td_Min: 5%) in the comparative example whereas the dead time TdL of the low-side switching device through which the reverse current flows is varied depending on the target number of revolutions and the target torque of the motor 12 and the power supply voltage in the exemplary embodiment.

During a switching period c, the phase current is larger than the certain value, the current sign of the phase current is positive, and the reverse current flowing through the switching device is larger than the commutation current flowing through the free wheeling diode connected in anti-parallel to the switching device. The dead time TdH and the dead time TdL are constant (for example, are set to the certain minimum dead time Td_Min: 5%) in the comparative example whereas the dead time TdL of the low-side switching device through which the reverse current flows is varied depending on the target number of revolutions and the target torque of the motor 12 and the power supply voltage in the exemplary embodiment.

As described above, according to the control apparatus 10 for the switching circuit according to the embodiments, the control of the ON time of the switching device parallel to the free wheeling diode through which the commutation current flows on the basis of the target number of revolutions and the target torque, which are parameters used in the control of the motor 12, allows the loss in the switching circuit (that is, the inverter 13) to be reduced while considering the property of the motor 12. In addition, it is possible to prevent the control processing from being complicated.

When the target number of revolutions or the target torque of the motor 12 is increased, the increase in the commutation current flowing through the free wheeling diode allows the conductive loss caused by the reverse current flowing through the switching device connected in parallel to the free wheeling diode to be reduced, thereby reducing the loss in the switching circuit (that is, the inverter 13).

Furthermore, the control of the ON time of the switching device on the basis of the power supply voltage (that is, the voltage output from the battery 11) allows the ON time of the switching device parallel to the free wheeling diode through which the commutation current flows to be finely and flexibly controlled in comprehensive consideration of the properties of the motor 12 and the switching circuit (that is, the inverter 13), thereby reducing the loss in the switching circuit (that is, the inverter 13).

Although the currents Iu, Iv, and Iw for the respective phases of the motor 12 are detected by the phase current detectors 32 for the respective phases in the above embodiments, the currents Iu, Iv, and Iw for the respective phases are not limitedly detected in the above manner. For example, the currents Iu, Iv, and Iw for the respective phases may be estimated on the basis of a detected value supplied from a current sensor that detect the DC-side current of the inverter 13 and the PWM signals supplied from the PWM calculator 25.

According to an embodiment, a control apparatus for a switching circuit (for example, the inverter 13) that includes a plurality of bidirectional conduction switching devices (for example, the transistors UH, UL, VH, VL, WH, and WL) connected in series to each other and a reverse conducting device (for example, the free wheeling diodes DUH, DUL, DVH, DVL, DWH, DWL) with respect to forward conduction of the switching devices, which is connected in parallel to each switching device, and that performs power conversion between a direct current power source (for example, the battery 11) and an alternating current motor (for example, the motor 12) includes a control unit (for example, the PWM calculator 25) that turns on the switching device parallel to the reverse conducting device when a commutation current flows through the reverse conducting device; a target-number-of-revolutions acquiring unit (for example, the processing unit 14) that acquires a target number of revolutions of the alternating current motor; a target-torque acquiring unit (for example, the processing unit 14) that acquires a target torque of the alternating current motor; and an on-time varying unit (for example, the dead time calculator 25a) that varies an ON time when the switching devices are turned on on the basis of the target number of revolutions and the target torque. With the control apparatus for the switching circuit, the control of the ON time of the switching device parallel to the reverse conducting device through which the commutation current flows on the basis of the target number of revolutions and the target torque, which are parameters used in the control of the alternating current motor, allows the loss in the switching circuit to be reduced while considering the property of the alternating current motor. In addition, it is possible to prevent the control processing from being complicated.

In the control apparatus for the switching device, the on-time varying unit preferably decreases the ON time with the increasing target number of revolutions and preferably decreases the ON time with the increasing absolute value of the target torque in which powering is set to positive and regeneration is set to negative. When the forward current is increased, the increase in the commutation current flowing through the reverse conducting device allows the conductive loss caused by the commutation current flowing through the switching device to be reduced, thereby reducing the loss in the switching circuit.

The control apparatus for the switching device may further include a voltage detecting unit (for example, the voltage sensor 33) that detects a voltage of the direct current power source, and the on-time varying unit may vary the ON time on the basis of the voltage detected by the voltage detecting unit. It is possible to finely and flexibly control the ON time of the switching device parallel to the reverse conducting device through which the commutation current flows in comprehensive consideration of the properties of the alternating current motor and the switching circuit to reduce the loss in the switching circuit.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for a switching circuit that includes a plurality of bidirectional conduction switching devices connected in series to each other and a plurality of reverse conducting devices respectively connected in parallel to the bidirectional conduction switching devices with respect to forward conduction of the bidirectional conduction switching devices, and that is configured to perform power conversion between a direct current power source and an alternating current motor, the control apparatus comprising:
   a controller configured to turn on the bidirectional conduction switching device provided parallel to the reverse conducting device through which a commutation current flows;
   a target-rotational-speed acquiring device configured to acquire a target rotational speed of the alternating current motor;
   a target-torque acquiring device configured to acquire a target torque of the alternating current motor; and
   an ON-time varying device configured to vary, in a current area in which conductive loss of the bidirectional conduction switching is greater than conductive loss of the reverse conducting device, on a basis of the target rotational speed and the target torque, an ON time period during which the bidirectional conduction switching device is turned on when the commutation current flows through the reverse conducting device such that the commutation current flows through both the bidirectional conduction switching device and the reverse conducting device which are connected in parallel to each other, the ON-time varying device being configured to decrease the ON time period with an increase in the forward conduction in accordance with an increase in the target rotational speed and configured to decrease the ON time period with an increase in the forward conduction in accordance with an increase in absolute value of the target torque in which powering is set to positive and regeneration is set to negative.

2. The control apparatus for the switching device according to claim 1, further comprising:
   a voltage detector configured to detect a voltage of the direct current power source,
   wherein the ON-time varying device is configured to decrease, in a current area in which conductive loss of the bidirectional conduction switching is greater than conductive loss of the reverse conducting device, on a basis of the voltage detected by the voltage detector, the ON time period with an increase in the forward conduction in accordance with a decrease in the voltage.

3. The control apparatus for the switching device according to claim 1,
   wherein the ON-time varying device is configured to vary the ON time period by varying a dead time period corresponding to the ON time period, and wherein the bidirectional conduction switching device provided parallel to the reverse conducting device through which the commutation current flows is turned off during the dead time period.

4. The control apparatus for the switching device according to claim 3,
wherein the ON-time varying device is configured to decrease the ON time period by increasing the dead time period corresponding to the ON time period, and
wherein the ON-time varying device is configured to increase the ON time period by decreasing the dead time period corresponding to the ON time period.

5. A control apparatus for a switching circuit that includes a plurality of bidirectional conduction switching devices connected in series to each other and a plurality of reverse conducting devices respectively connected in parallel to the bidirectional conduction switching devices with respect to forward conduction of the bidirectional conduction switching devices, and that is configured to perform power conversion between a direct current power source and an alternating current motor, the control apparatus comprising:
controlling means for turning on the bidirectional conduction switching device provided parallel to the reverse conducting device through which a commutation current flows;
target-rotational-speed acquiring means for acquiring a target rotational speed of the alternating current motor;
target-torque acquiring means for acquiring a target torque of the alternating current motor; and
an ON-time varying means for varying, in a current area in which conductive loss of the bidirectional conduction switching is greater than conductive loss of the reverse conducting device, on a basis of the target rotational speed and the target torque, an ON time period during which the bidirectional conduction switching device is turned on when the commutation current flows through the reverse conducting device such that the commutation current flows through both the bidirectional conduction switching device and the reverse conducting device which are connected in parallel to each other, the ON-time varying means being configured to decrease the ON time period with an increase in the forward conduction in accordance with an increase in the target rotational speed and configured to decrease the ON time period with an increase in the forward conduction in accordance with an increase in absolute value of the target torque in which powering is set to positive and regeneration is set to negative.

* * * * *